(12) United States Patent
Inoue et al.

(10) Patent No.: US 7,173,213 B2
(45) Date of Patent: Feb. 6, 2007

(54) TORCH CABLE DISPOSITION STRUCTURE FOR ARC-WELDING ROBOT

(75) Inventors: Toshihiko Inoue, Fujiyoshida (JP); Kazutaka Nakayama, Minamitsuru-gun (JP); Takatoshi Iwayama, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/165,350

(22) Filed: Jun. 24, 2005

(65) Prior Publication Data

US 2006/0000817 A1 Jan. 5, 2006

(30) Foreign Application Priority Data

Jun. 30, 2004 (JP) ............... 2004-194593

(51) Int. Cl.
 *B23K 9/12* (2006.01)
(52) U.S. Cl. ............... 219/125.1; 219/137.9; 901/42
(58) Field of Classification Search ........... 219/125.1, 219/137.9; 901/42
See application file for complete search history.

(56) References Cited

U.S. PATENT DOCUMENTS

| | | | |
|---|---|---|---|
| 4,539,465 A * | 9/1985 | Bosna | 219/137.7 |
| 5,274,213 A * | 12/1993 | Sartorio | 219/125.1 |
| 6,335,510 B1 * | 1/2002 | Carbines | 219/125.1 |
| 7,105,771 B2 * | 9/2006 | Inoue et al. | 219/125.1 |
| 2004/0144764 A1 * | 7/2004 | Inoue et al. | 219/137.9 |
| 2006/0049159 A1 * | 3/2006 | Nihei et al. | 219/137.9 |

FOREIGN PATENT DOCUMENTS

| | | | |
|---|---|---|---|
| DE | 85 19 446.8 U1 | | 11/1985 |
| DE | 297 20 048 U1 | * | 3/1999 |
| DE | 297 20 048 U1 | | 4/1999 |
| EP | 1 083 030 A | | 3/2001 |
| JP | 5-309586 | | 11/1993 |
| JP | 9-216189 | | 8/1997 |
| JP | 11-77306 | * | 3/1999 |
| JP | 2001-287033 | | 10/2001 |
| JP | 2004-223576 | | 8/2004 |

* cited by examiner

*Primary Examiner*—Kevin P. Kerns
(74) *Attorney, Agent, or Firm*—Drinker, Biddle & Reath LLP

(57) ABSTRACT

A first wrist element is rotatably provided on the front end of a forearm base of a robot. A second wrist element is rotatably provided on the first wrist element. A welding torch is rotatably supported via a transmission mechanism. A wire feeder is disposed at a position other than a forearm. A torch cable is fitted to a slider with an intermediate fitting section. A slider can be pulled backward by returning a wire connected to a tension generator using a pulley. In place of the fitting section, an intermediate guiding section can be provided.

12 Claims, 12 Drawing Sheets

PRIOR ART

TO WELDING WIRE DRUM

TO WELDING WIRE DRUM

TO WELDING WIRE DRUM

POSTURE 1

POSTURE 2

POSTURE 3

POSTURE 4

POSTURE 5

POSTURE 6

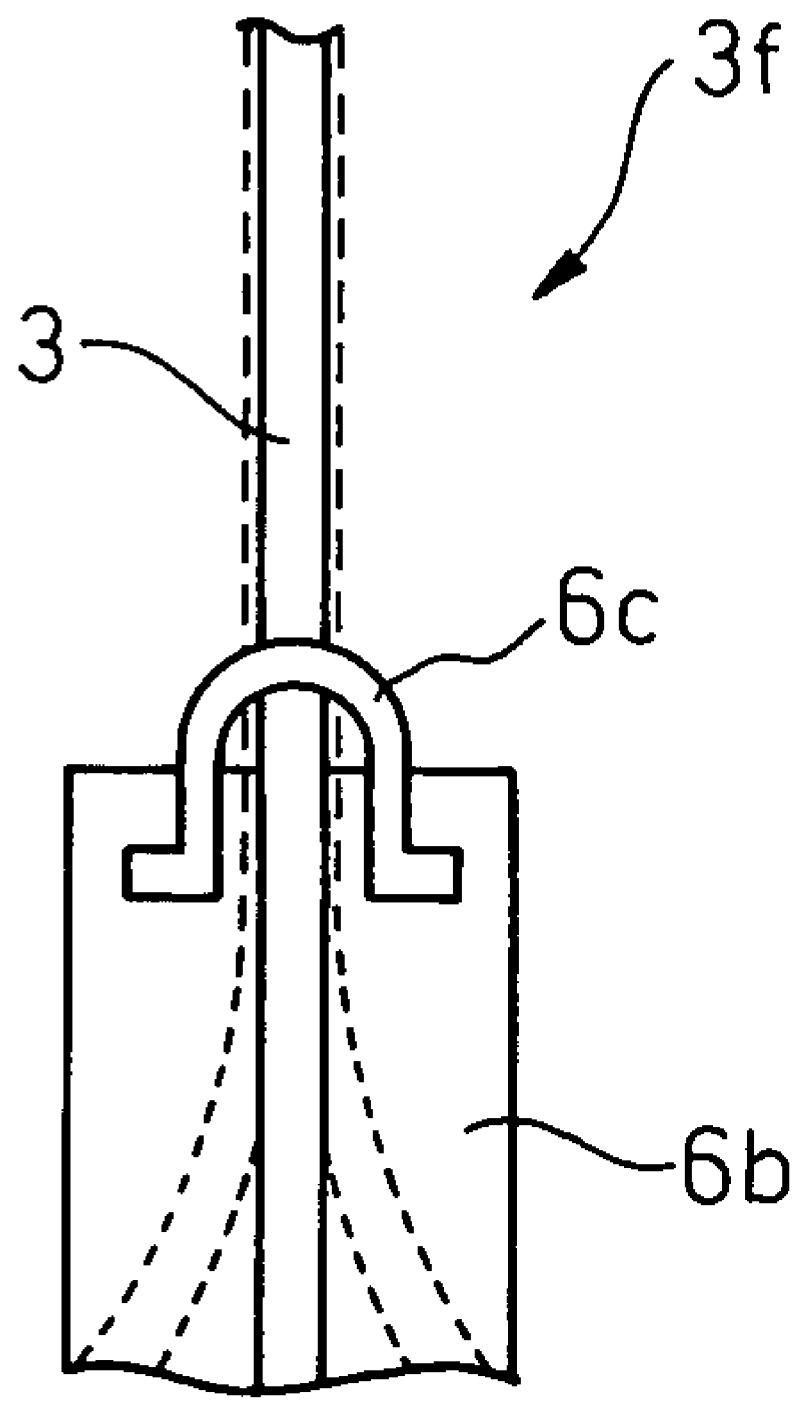

TORCH CABLE DISPOSITION STRUCTURE FOR ARC-WELDING ROBOT

BACKGROUND OF THE INVENTION

1. Field of the Invention

The present invention relates to a torch cable disposition structure for an industrial robot including an arc-welding torch.

2. Description of the Related Art

As one representative application of a robot, there is an arc-welding robot. The arc-welding robot is an industrial robot that executes arc-welding on a work using an arc-welding torch (hereinafter simply referred to as a "welding torch") mounted on a part of the robot near the front end of an arm. In a shop floor where the arc-welding robot is used, welding work must be carried out, in many cases, by putting an arm of the arc-welding robot into a narrow space between the work pieces, tools, and peripheral equipment. In these cases, interference can easily occur on the basis of the moving of the arc-welding robot.

Particularly, the torch cable that is connected to the welding torch has a risk of interference with the surrounding work pieces, tools, and peripheral equipment, as compared with the arm and the welding torch, at the front end of the robot, that move in a relatively narrow area. One of reasons for this is that the torch cable is loosely laid around a robot main body to secure stability of feeding a welding wire, and this increases the area of the interference with the surrounding.

In this situation, some proposals have been made to solve the interference of the torch cable. FIG. 1 is a front view of an arc-welding robot system that employs the torch cable disposition structure disclosed in Japanese Patent Application No. 2003-14942 (Japanese Unexamined Patent Publication No. 2004-223576). As shown in FIG. 1, a first wrist element 11 is rotatably provided around a first axis line A, on the front end of a forearm base 10 of an arc-welding robot (hereinafter also simply referred to as a "robot"). A second wrist element 12 is rotatably or pivotably provided around a second axis line B, on the first wrist element 11. A welding torch 2 is rotatably or pivotably supported around a third axis line C via a transmission mechanism 13. The third axis line C is disposed approximately perpendicular to the second axis line B and is separated from the first axis line A by a predetermined distance. In other words, the welding torch 2 is rotatably or pivotably supported around the axis C parallel with a final rotation axis of the robot offset by a certain amount.

A sliding mechanism 6 is provided on the forearm base 10 via a supporting base 5, and a wire feeder 4 is mounted on the sliding mechanism 6. The wire feeder 4 draws a welding wire from a welding wire drum, and feeds the welding wire to the welding torch 2 using a torch cable 3. A welding power supply unit 21 supplies power to the welding wire and the wire feeder via a power feeder 22. A power supply control (i.e., a control of a welding voltage and a welding current, and a control of a wire feeding) is carried out based on an instruction transmitted from a robot controller 20 to the welding power supply unit 21.

The sliding mechanism 6 on the forearm base 10 is reciprocally movable along a direction approximately parallel with the first axis line A. The wire feeder 4 is mounted on the sliding mechanism 6. The sliding mechanism 6 utilizes a linear motor controlled by the robot controller 20. Therefore, the robot controller 20 can also control the position of the wire feeder 4 on the sliding mechanism 6 to suitably maintain the tension of the torch cable 3.

As described above, in the torch cable disposition structure disclosed in Japanese Patent Application No. 2003-14942, the welding torch 2 is rotatably provided around the axis parallel with a final rotation axis of the robot but offset by a certain amount. At the same time, the wire feeder 4 is slidably mounted on the forearm base 10 of the robot. Therefore, even when the posture of the welding torch 2 is changed, the posture of the torch cable 3 hardly changes. As a result, the interference between the torch cable 3 and the workpiece, the tool, and the peripheral equipment can be minimized, thereby realizing a stable feeding of the welding wire.

There is also proposed a method of pulling a slider for slidably mounting the wire feeder onto the forearm base of the robot, to rearward of the forearm, thereby preventing the torch cable from being excessively pulled or excessively loosened, as disclosed in Japanese Patent Application No. 2004-71304.

However, even when the measures disclosed in Japanese Patent Application No. 2003-14942 and Japanese Patent Application No. 2004-71304 are taken, a margin is necessary, in the space above the welding robot and the space behind the robot, because the wire feeder is mounted on the sliding mechanism provided on the forearm base. In other words, as can be easily understood from FIG. 1, the wire feeder is positioned above the sliding mechanism provided on the forearm base. Further, the wire feeder moves toward obliquely above and behind the forearm on the sliding mechanism, and also pivots around the D axis together with the forearm. Therefore, when sufficient space is not present around the forearm, the wire feeder has a risk of interference with external devices and wall surfaces.

It is an object of the present invention to provide a torch cable disposition structure for an arc-welding robot that can avoid interference due to the mounting of a wire feeder on the forearm, while taking advantage of the prevention of an excessive loosening or tension of the torch cable obtained by the sliding mechanism.

SUMMARY OF THE INVENTION

According to the present invention, a wire feeder is installed in an arc-welding robot except for a forearm. An "intermediate fitting section" or an "intermediate guiding section" for a torch cable that is laid or disposed from the wire feeder toward a welding torch is provided on a forearm base. Based on the employment of this cable disposition structure, the above problems are solved. When the "intermediate fitting section" for the torch cable is provided on the forearm, an intermediate part of the torch cable is fitted on the fitting section via a sliding mechanism reciprocally movable along a direction approximately parallel with a first axis line. When the "intermediate guiding section" for the torch cable is provided on the forearm base, a guiding member that guides the intermediate part of the torch cable in a state reciprocally movable along a direction approximately parallel with the first axis line is provided in the guiding section.

More specifically, a torch cable disposition structure for an arc-welding robot includes a forearm base, a first wrist element, a second wrist element, and a welding torch. The first wrist element is rotatably provided around a first axis line along a longitudinal direction of the forearm, on the front end of the forearm base. The second wrist element is rotatably provided around a second axis line that crosses the first axis line approximately perpendicularly, on the first wrist element. The welding torch is rotatably provided around a third axis line that is approximately perpendicular to the second axis line and is away from the first axis line with a predetermined distance, on the second wrist element. A welding wire is supplied to the welding torch using a torch cable. The torch cable disposition structure for the arc-welding robot has the following characteristics.

According to a first aspect of the invention, the torch cable is disposed from a wire feeder provided at a position other than at the forearm, toward the welding torch via an intermediate fitting section provided on the forearm base. An intermediate part of the torch cable is fitted to the intermediate fitting section via a sliding mechanism reciprocally movable along a direction approximately parallel with the first axis line.

According to a second aspect of the invention, the wire feeder can be disposed at a position other than a robot movable arm. According to a third aspect, the wire feeder can be mounted on an upper arm of the robot. According to a fourth aspect, the wire feeder can be mounted on a rotating body.

According to a fifth aspect of the invention, there can be provided a unit that applies force to pull a slider of the sliding mechanism in a direction parallel with the first axis line and opposite to the working tool, in the second or third aspect of the invention.

According to a sixth aspect of the invention, the torch cable is disposed from the wire feeder provided at a position other than the forearm, toward the welding torch via an intermediate guiding section provided on the forearm base. A guiding member that guides an intermediate part of the torch cable in a reciprocally movable state along a longitudinal direction of the torch cable is provided in the intermediate guiding section.

The torch cable can be disposed on a latter part of the forearm to have a sufficient length to absorb the move of the torch cable.

According to a seventh aspect of the invention, the guiding member is rotatably supported around an axis perpendicular with the longitudinal direction of the torch cable. According to an eighth aspect of the invention, there can be provided a unit that applies force to pull the guiding member to a direction parallel with the longitudinal direction of the torch cable and opposite to the welding torch, in the sixth or seventh aspect of the invention.

According to a ninth aspect of the invention, the torch cable has plural tubular bodies including a welding wire liner, an assist gas tube, and a welding current conductor, in all the above aspects of the invention. The tubular bodies are covered with a flexible pipe. One end of the pipe is connected to the welding torch at a first connecting portion at the welding torch side, and the other end of the pipe is connected to the wire feeder at a second connecting portion at the wire feeder side.

According to the present invention, the wire feeder is mounted on a position separate from the forearm. Therefore, a device on the forearm can be simplified and this prevents generation of a large interference area at the back of and above the robot. When the wrist axis of the robot moves, the intermediate fitting section or the intermediate guiding section can limit the movement of the torch cable, thereby stabilizing the posture of the torch cable.

As a result, an excessive tension and an excessive loosening of the torch cable can be avoided. Even when the wrist moves, a change in the curvature of the torch cable can be minimized, thereby stabilizing the posture of the torch cable. Consequently, it is possible to avoid unstable feeding of the welding wire using the torch cable. Accordingly, the welding quality can be improved.

These and other objects, features and advantages of the present invention will be more apparent in light of the detailed description of exemplary embodiments thereof as illustrated by the drawings.

BRIEF DESCRIPTION OF THE DRAWINGS

In the drawings,

FIG. 13 is an explanatory diagram of an intermediate guiding section of a torch cable.

DETAILED DESCRIPTIONS

Torch cable disposition structures in an arc-welding robot system according to embodiments of the present invention are explained below with reference to FIG. 2 to FIG. 13. As described above, according to the cable disposition structure of the present invention, a torch cable is disposed from a wire feeder provided at "a position other than a forearm" toward a welding torch via an "intermediate fitting section" or an "intermediate guiding section" provided on the forearm. Various positions can be selected for a "position other than the forearm".

As representative examples, (1) the wire feeder is provided at a position other than the robot in a first embodiment, (2) the wire feeder is mounted on the upper arm of the robot in a second embodiment, and (3) the wire feeder is mounted on a rotating body of the robot in a third embodiment and a fourth embodiment. There is also flexibility in the selection of the "intermediate fitting section" or the "intermediate guiding section". The "intermediate fitting section" is employed in the first to the third embodiments, and the "intermediate guiding section" is employed in the fourth embodiment. In the second to the fourth embodiments, only points different from those in the first embodiment are explained in order to avoid repetitive explanation of the same items.

[First Embodiment]

Figure 2A:
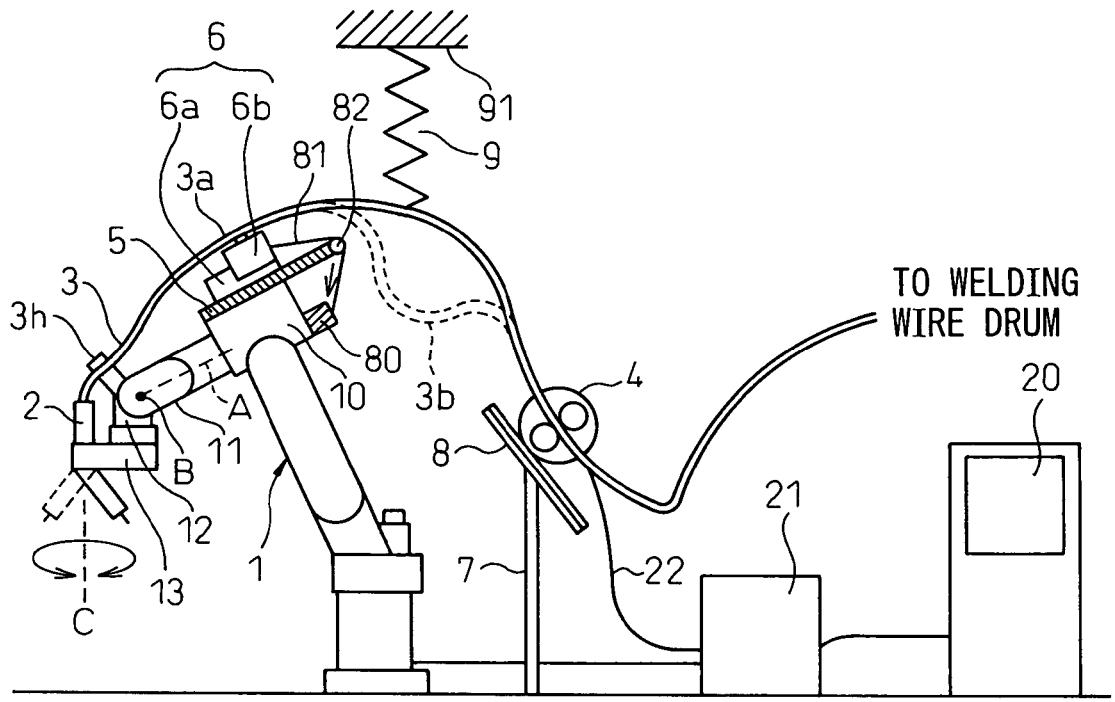
FIG. 2a is a front view of a schematic configuration of an arc-welding robot system that employs a torch cable disposition structure according to a first embodiment of the present invention.
Figure 2B:
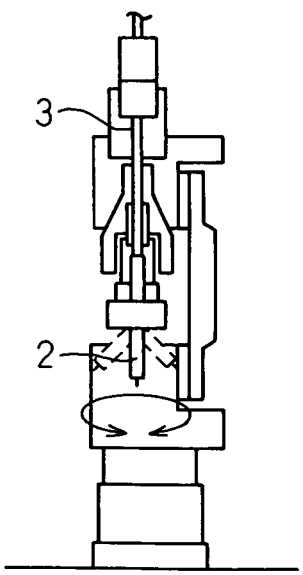
FIG. 2b is a right side view of a schematic configuration of the arc-welding robot system that employs a torch cable disposition structure according to the first embodiment.

FIG. 2a and FIG. 2b are a front view and a right side view respectively of a schematic configuration of an arc-welding robot system having a torch cable disposition structure according to the first embodiment of the present invention. The arc-welding robot 1 has six axes. The first wrist element 11 is rotatably provided around the first axis line A, on the front end of the forearm base 10. The second wrist element 12 is rotatably provided around the second axis line B, on the first wrist element 11. The welding torch 2 is rotably supported around the third axis line C via the transmission mechanism 13. The third axis line C is disposed approximately perpendicularly to the second axis line B and is away from the first axis line A with a predetermined distance. In other words, the welding torch 2 is rotatably supported around the axis C parallel with a final rotation axis of the robot offset by a certain amount.

Figure 9:
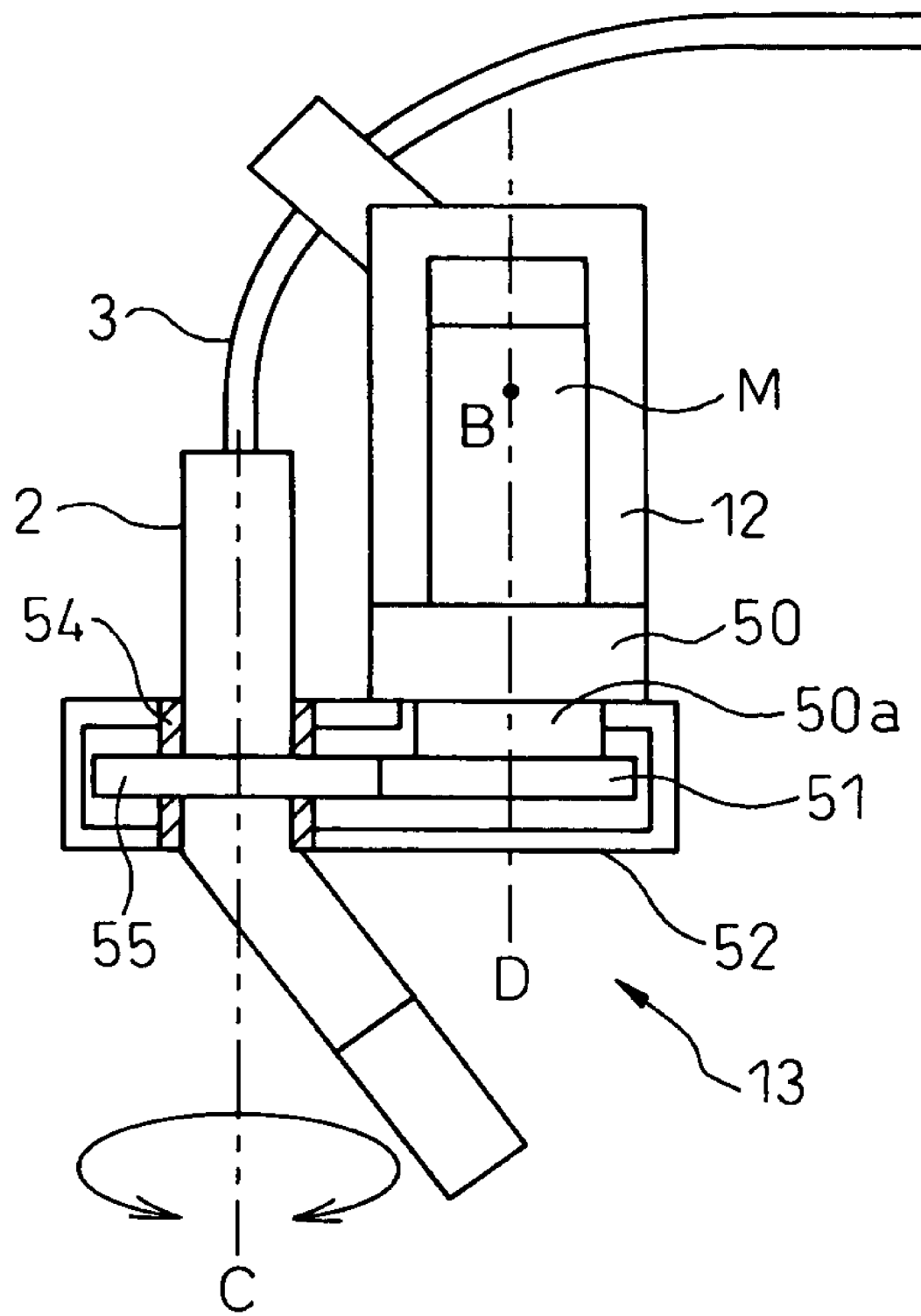
FIG. 9 is a cross-sectional view of an example of a supporting and rotating mechanism of a welding torch 2.
Figure 10:
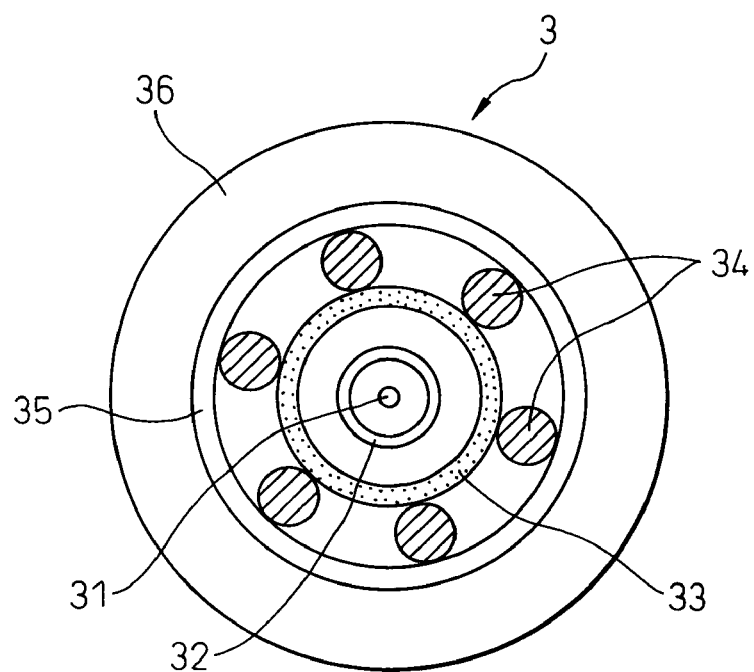
FIG. 10 is a cross-sectional view of an example of a torch cable.

An example of a supporting and rotating mechanism of the welding torch 2 is shown in FIG. 9. As shown in FIG. 9, a servomotor M for driving a sixth axis is provided in the second wrist element 12. A reduction device 50 is connected to the servomotor M. The reduction device 50 includes bearings that support a flange 50a at an output side (hereinafter referred to as an output flange). An input gear 51 is connected to the output flange 50a of which rotation is controlled around the axis D via the servomotor M and the reduction device 50.

A gear box casing 52 is mounted on the base portion of the output flange 50a. The welding torch 2 is rotatably mounted on the gear box casing 52 via bearings 54 around the axis line C perpendicular to the axis line B and with a predetermined distance from the axis line A (see FIGS. 2a and 2b).

An output gear 55 that is integrated with the welding torch rotation axis is engaged with the input gear 51. Based on this engagement, a direction of the welding torch 2 can be freely controlled by rotation according to an instruction from the robot controller 20. While turning force is transmitted with the gears in this example, the direction of the welding torch 2 may be also controlled by rotation using other power transmission element such as a structure using a belt and a pulley.

In order to prepare for a changing of a posture around the axis in a longitudinal direction of the welding torch 2, it is preferable that a joint of the welding torch 2 and the torch cable 3 is rotatably supported using a known rotatable joint structure. With this arrangement, even when the torch 2 is rotated around the welding torch axis D, the torch cable 3 is not twisted or curled.

Figure 1:
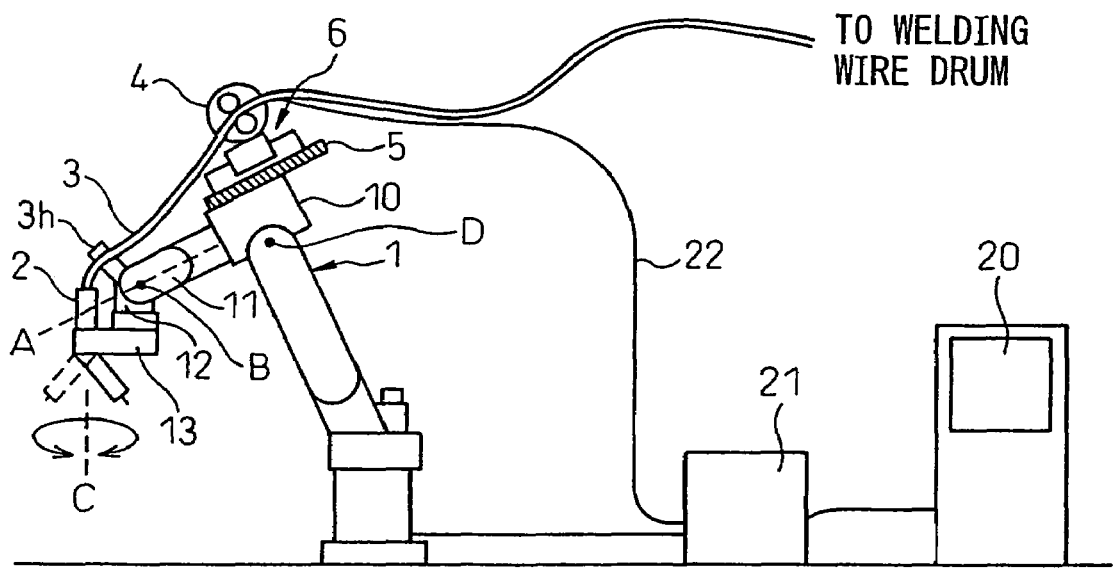
FIG. 1 is a front view of a schematic configuration of an arc-welding robot system that employs a torch cable disposition structure according to a related art.

Referring to FIG. 2a and FIG. 2b again, a reference numeral 7 denotes a stand on which the wire feeder 4 is installed at the outside of the robot 1. The wire feeder 4 is installed on a mounting table 8 at the front end of the stand 7. The stand 7 can have a height smaller than that of the robot 1. Preferably, the height of the stand 7 can be adjusted when necessary. As explained above, the wire feeder 4 is installed on the mounting table 8 of the stand 7 instead of on the forearm like the related art (see FIG. 1). The welding wire is pulled out from the welding wire drum, and is fed to the welding torch 2 using the torch cable 3.

In the middle of the course from the wire feeder 4 to the welding torch 2, the torch cable 3 passes through an intermediate fitting section 3a mounted via the sliding mechanism 6 on the forearm base 10. The sliding mechanism 6 has a linear guide 6a that is disposed on the forearm 10 via the supporting base 5, and a slider 6b that is slidably fitted along a direction approximately parallel with the first axis line A on the linear guide 6a. An intermediate part of the torch cable 3 is clamped (fixed) to the slider 6b. A reference numeral 3h denotes a piercing guide 3h that is provided on the second wrist element 12. The torch cable 3 passes through the piercing guide 3h, and is connected to the welding torch 2.

According to the present embodiment, the sliding mechanism 6 has a pulling mechanism for always pulling the slider 6b backward at substantially constant force. In other words, one end of a wire 81 is connected to a back end of the slider 6b, and the other end of the wire 81 is connected to a tension generator 80. A reference numeral 82 denotes a pulley that guides the wire 81, and is fitted to a back end of the supporting base 5. Therefore, the wire 81 connect the slider 6b and the tension generator 80 via the pulley 82. The tension generator 80 is a known unit using a spring or an air cylinder, and is fitted to the back of the forearm 10, for example. A reference numeral 3b denotes a looseness of the torch cable 3 that is generated when the slider 6b is pulled toward the back of the forearm 10. Preferably, a suspender (i.e., a spring) 9 is dropped from a ceiling 91 and elastically suspends the torch cable 3 when necessary, thereby preventing the looseness 3b from being brought into contact with the robot 1.

While the pulling mechanism for pulling the slider 6b backward at substantially constant force is explained in the present embodiment, the sliding mechanism 6 can be modified variously. For example, the pulling mechanism is excluded, and the position of the slider 6*b* on the linear guide 6*a* may be determined according to the force applied to the intermediate fitting section 3*a*.

Power can be supplied to the welding wire and the wire feeder 4 according to the related art. In other words, the welding power supply unit 21 supplies power to the welding wire and the wire feeder 4 via the power feeder 22. A power supply control (i.e., a control of a welding voltage and a welding current, and a control of a wire feeding) is carried out based on an instruction transmitted from the robot controller 20 to the welding power supply unit 21.

When welding, the robot 1 moves to a target position based on an instruction from the robot controller 20 so that the welding torch 2 mounted on the front end of the wrist can feed the welding wire to a welding position of an object to be welded in an assigned posture. At the same time, the robot controller 20 outputs a welding instruction to the welding power supply unit 21. The welding power supply unit 21 controls a welding voltage and a welding current of the welding wire at the front end of the welding torch in synchronism with the operation of the robot 1.

A mechanism of the torch cable 3 is explained below. There is no particular limit to the mechanism of the torch cable 3 that is used in the present invention, and a mechanism of a torch cable shown in FIG. 10 can be used. In other words, a liner (i.e., a conduit liner) 32 is disposed at the center of the cable. An internal space of the liner 32 is used as a passage of the welding wire 31. The liner 32 is accommodated within a gas hose 33 for passing assist gas. Conductors 34 are disposed at the outside of the gas hose 33. Several conductors 34 are present (usually a few conductors). These conductors 34 are laid out at a distance from each other around the external periphery of the gas hose 33. A press tape 35 is wound around the conductors 34. A sheath 36 is provided around the press tape 35.

By laying out the conductors 34 with a distance each other, when the fitted torch cable 3 is deformed by bending or distortion, the conductors 34 move away from the deformation of the bending or the distortion. With this arrangement, the deformation fatigue of the conductors 34 can be decreased.

Figure 11:
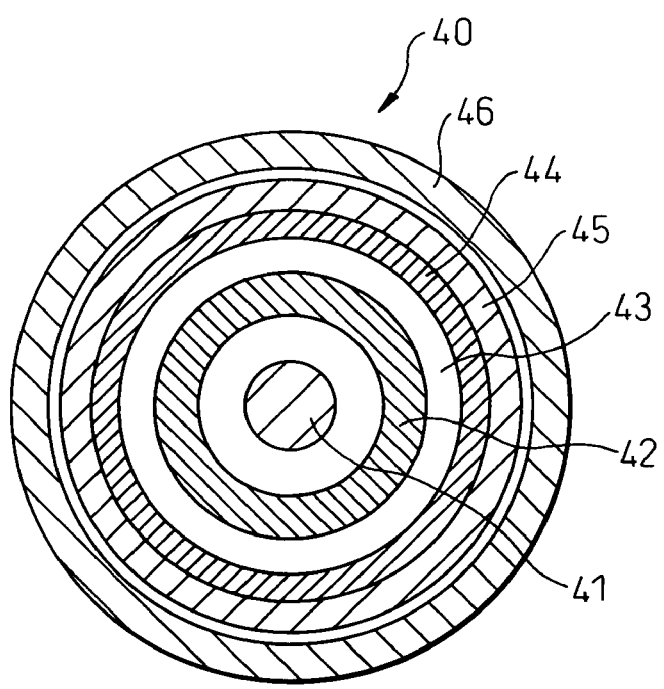
FIG. 11 is a cross-sectional view of another example of a torch cable.

Alternatively, a torch cable as indicated by a reference numeral 40 in FIG. 11 can be employed. As shown in FIG. 11, the torch cable 40 has a double structure using two sheaths 44 and 46. Within the internal sheath 44, a welding wire feeding spring 42 is provided. The welding wire feeding spring 42 is wound spirally around the center of the cross section of the torch cable 40 to form a tunnel-shaped path. A welding wire 41 can freely pass through the tunnel-shaped path.

A power cable 45 is provided between the internal sheath 44 and the external sheath 46. The power cable 45 is used to supply power to the welding torch 2 for the welding. The power cable 45 is electrically connected to the power feeder 22 within the wire feeder 4, and is also electrically connected to the welding wire within the welding torch 2. A space 43 is formed within the internal sheath 44. Assist gas (i.e., inert gas) supplied from an assist gas source (not shown) flows through a path formed by the space 43. The assist gas that passes through the assist gas path is blown toward a welding part from the opening at the front end of the welding torch.

Figure 12:
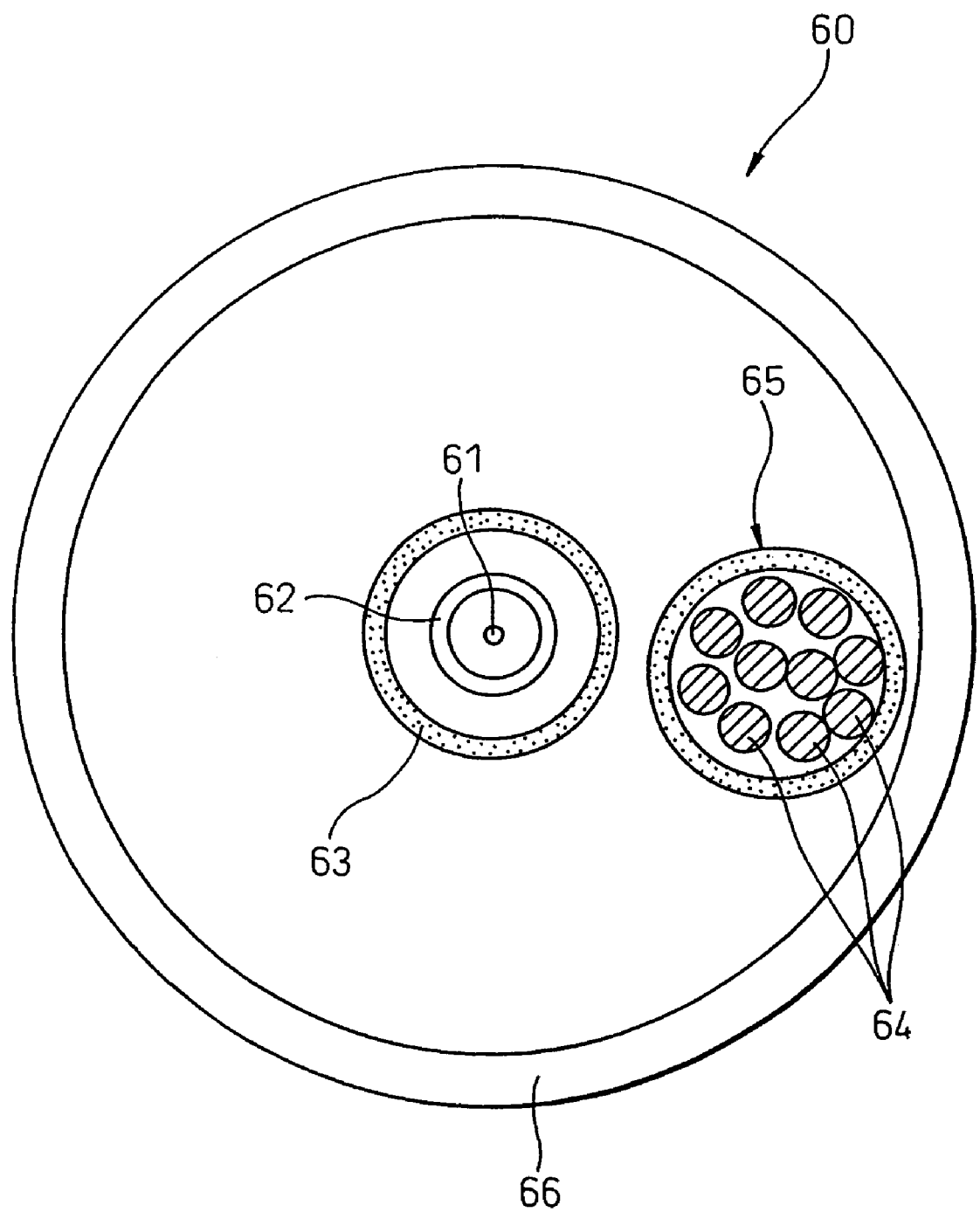
FIG. 12 is a cross-sectional view of still another example of a torch cable.

Alternatively, a torch cable as indicated by a reference numeral 60 in FIG. 12 can be employed. As shown in FIG. 12, the torch cable 60 has a liner (i.e., a conduit liner) 62 used as a path of a welding wire 61, a gas hose 63 that passes assist gas, and a movable multicore cable 65 formed by bundling plural conductors 64. The liner 62, the gas hose 63, and the movable multicore cable 65 are covered a flexible tube 66. A suitable flexible resin material can be selected as a material for the tube 66. The liner 62 is passed through the gas hose 63, and is disposed to pass through substantially the axis core of the tube 66. In other words, a double duct consisting of the liner 62 and the gas hose 63 passes through substantially the axis core of the tube 66. The gas hose 63 for the assist gas has a smaller length than that of other striate bodies. The gas hose 63 for the assist gas is bent first among the constituent elements of the torch cable 60, thereby the gas hose 63 receives a twisting force. Therefore, the tube 66 is prevented from being directly affected by the tensile force.

On the other hand, within the tube 66, the movable multicore cable 65 structured by bundling the plural conductors 64 is disposed separately from the gas hose 63 having the liner 62 passed through the inside of the gas hose 63. In other words, the gas hose 63 and the movable multicore cable 65 are not structured in one integrated tubular body like the other structure (see FIG. 10 and FIG. 11). The movable multicore cable 65 is disposed to pass through a position deviated by a certain distance from the axis core of the tube 66.

As explained above, when the striate body (i.e., the liner 62 and the gas hose 63) for supplying the welding wire and the assist gas and the striate body (i.e., the movable multicore cable 65 that bundles the conductors 64) for supplying a welding current are passed separately through the tube 66, the line diameter of each striate body can be made small. Based on the double duct including the liner 62 and the gas hose 63, a very thin welding wire can be passed smoothly. This double duct can have a sufficiently small external diameter within a range having no trouble in passing the assist gas. The movable multicore cable 65 can also have many thin conductors 64 in one bundle. Therefore, the movable multicore cable 65 can have a small diameter and have flexibility.

The torch cable shown in FIG. 12 uses a conduit, and can properly increase the rigidity of the torch cable. As a result, the piercing guide can be freely reciprocally moved following the force applied to the torch cable, without additionally providing a member that gives a pulling force.

[Second Embodiment]

Figure 3A:
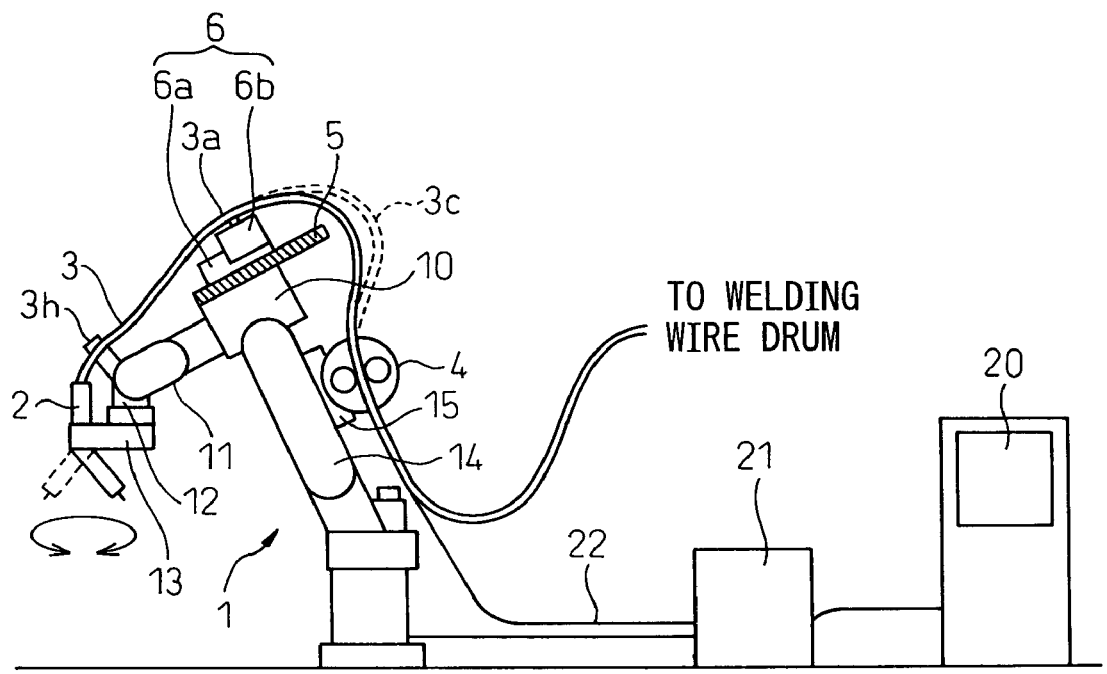
FIG. 3a is a front view of a schematic configuration of an arc-welding robot system that employs a torch cable disposition structure according to a second embodiment of the present invention.
Figure 3B:
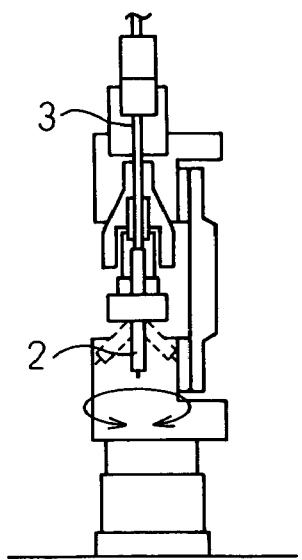
FIG. 3b is a right side view of a schematic configuration of the arc-welding robot system that employs a torch cable disposition structure according to the second embodiment.

FIG. 3*a* and FIG. 3*b* are a front view and a right side view respectively of a schematic configuration of an arc-welding robot system having a torch cable disposition structure according to the second embodiment of the present invention. The arc-welding robot according to the second embodiment is different from the arc-welding robot according to the first embodiment in that the installation position of the wire feeder 4 is changed. According to the second embodiment, a wire feeder supporting member 15 is fitted to a suitable position on an upper arm 14 of the robot 1 with a known unit (i.e., a setscrew or the like), and the wire feeder 4 is installed via the wire feeder supporting member 15.

The torch cable 3 is fixed to the slider 6 at the intermediate fitting section 3*a*, and is movably held along the longitudinal direction of the forearm (i.e., the forearm base 10 and the second wrist element 12). The torch cable 3 positioned at the back of the slider 6*b* absorbs the moving amount of the slider 6*b* between the slider 6*b* and the wire feeder 4. A reference numeral 3*c* denotes a looseness that is generated when the moving amount is absorbed.

According to the present embodiment, while the tension generating mechanism (i.e., the tension generator 80, the wire 81, and the pulley 82) used in the first embodiment is not employed, this tension generating mechanism can be used in a similar manner to that in the first embodiment.

[Third Embodiment]

Figure 4A:
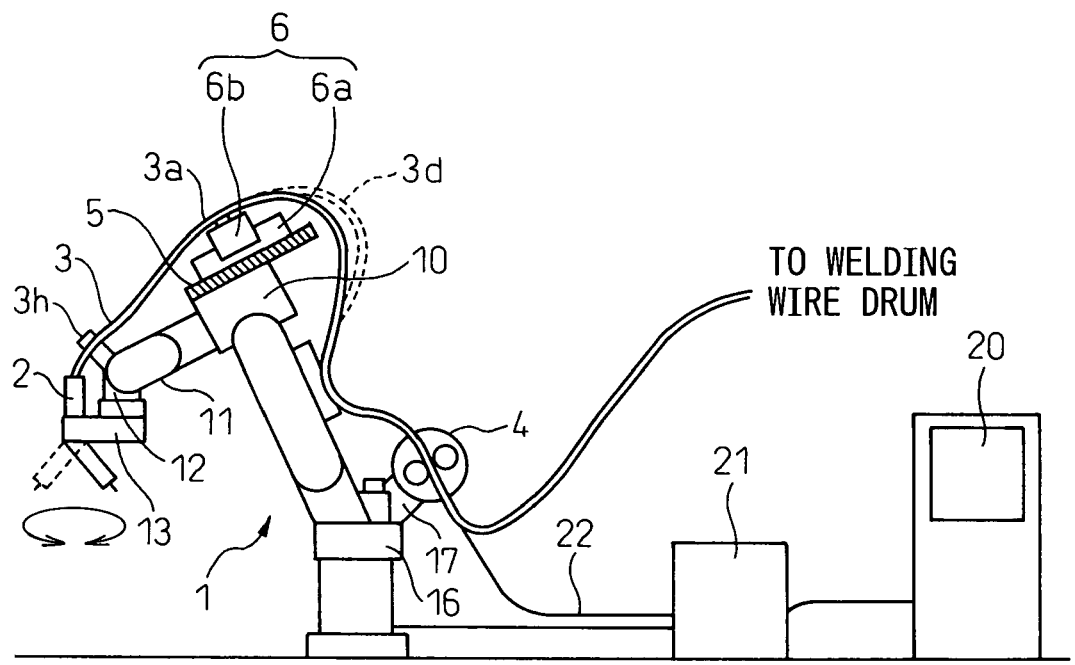
FIG. 4a is a front view of a schematic configuration of an arc-welding robot system that employs a torch cable disposition structure according to a third embodiment of the present invention.
Figure 4B:
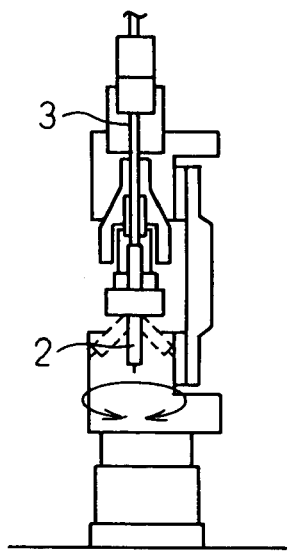
FIG. 4b is a right side view of a schematic configuration of the arc-welding robot system that employs a torch cable disposition structure according to the third embodiment.

FIG. 4a and FIG. 4b are a front view and a right side view respectively of a schematic configuration of an arc-welding robot system having a torch cable disposition structure according to the third embodiment of the present invention. According to the third embodiment, a wire feeder supporting member 17 is fitted to a suitable position on a rotating arm 16 of the robot 1 with a known unit (i.e., a setscrew or the like), and the wire feeder 4 is installed via the wire feeder supporting member 17.

The torch cable 3 is fixed to the slider 6 at the intermediate fitting section 3a, and is movably held along the longitudinal direction of the forearm (i.e., the forearm base 10 and the second wrist element 12). The torch cable 3 positioned at the back of the slider 6b absorbs the moving amount of the slider 6b between the slider 6b and the wire feeder 4. A reference numeral 3d denotes a looseness that is generated when the moving amount is absorbed.

According to the present embodiment, while the tension generating mechanism (i.e., the tension generator 80, the wire 81, and the pulley 82) used in the first embodiment is not employed, this tension generating mechanism can be used in a similar manner to that in the first embodiment.

[Fourth Embodiment]

Figure 5A:
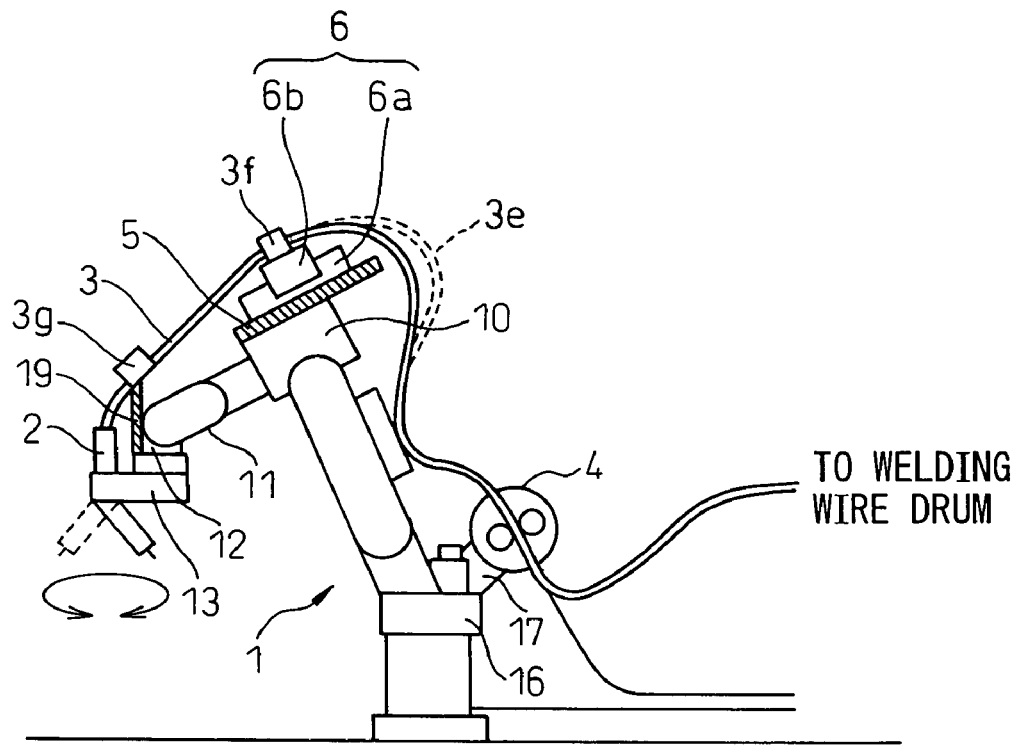
FIG. 5a is a front view of a schematic configuration of an arc-welding robot system that employs a torch cable disposition structure according to a fourth embodiment of the present invention.
Figure 5B:
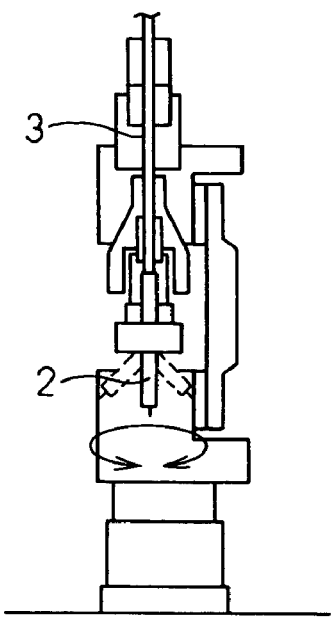
FIG. 5b is a right side view of a schematic configuration of the arc-welding robot system that employs a torch cable disposition structure according to the fourth embodiment.

FIG. 5a and FIG. 5b are a front view and a right side view respectively of a schematic configuration of an arc-welding robot system having a torch cable disposition structure according to the fourth embodiment of the present invention. According to the fourth embodiment, the wire feeder 4 is installed at the same position as that according to the third embodiment. In other words, the wire feeder supporting member 17 is fitted to a suitable position on the rotating arm 16 of the robot 1 with a known unit (i.e., a setscrew or the like), and the wire feeder 4 is installed via the wire feeder supporting member 17.

The arc-welding robot according to the fourth embodiment is different from the arc-welding robots in the first to the third embodiments in that an intermediate guiding section 3f is provided in place of the intermediate fitting section 3a. The intermediate guiding section 3f is provided via the sliding mechanism 6 similar to that according to the first to the third embodiments. In other words, as shown in FIG. 13, a piercing guide 6c is provided on the slider 6b, and the torch cable 3 is guided through this piercing guide 6c. The piercing guide 6c has a considerably larger external diameter than that of the torch cable 3. The torch cable 3 can be reciprocally movably guided with margin along a direction approximately parallel with the longitudinal direction of the forearm. Depending on the situation, the piercing guide 6c can be rotatably supported around the axis perpendicular to the longitudinal direction of the torch cable. With this arrangement, even when the first wrist element rotates, a bending of the torch cable can be relaxed.

In the fourth embodiment, the torch cable 3 positioned at the back of the slider 6b also absorbs the moving amount of the slider 6b between the slider 6b and the wire feeder 4. A reference numeral 3e in FIG. 5a denotes a looseness that is generated when the moving amount is absorbed.

Figure 6A:
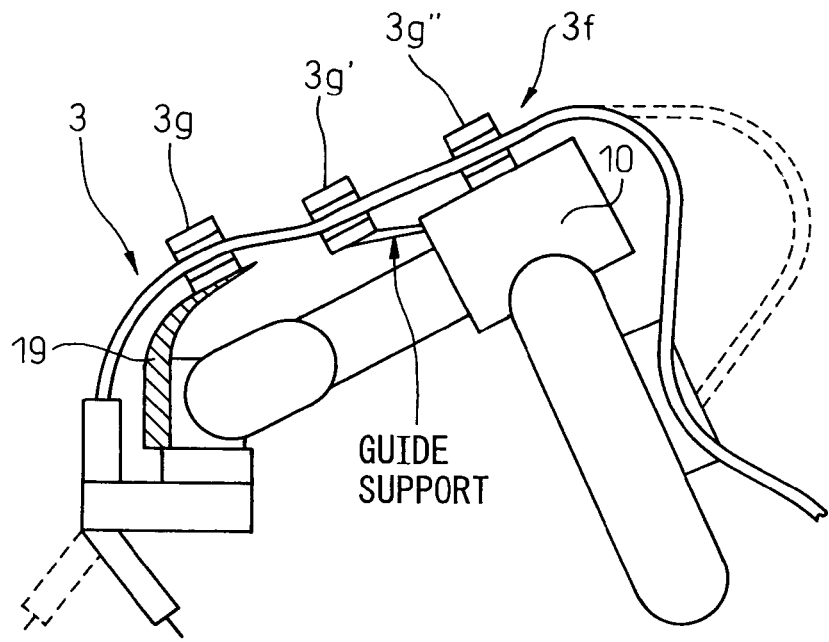
FIG. 6a is a front view of a schematic configuration of the arc-welding robot system according to a modification of the fourth embodiment.
Figure 6B:
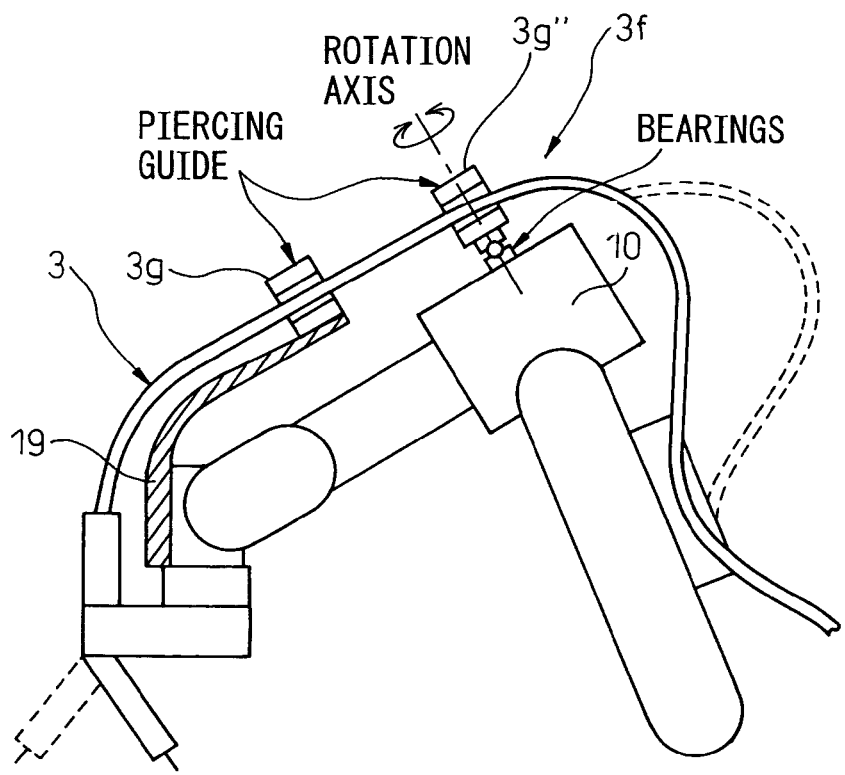
FIG. 6b is a front view of a schematic configuration of the arc-welding robot system according to another modification of the fourth embodiment.

The arc-welding robot according to the fourth embodiment is also different from the arc-welding robots in the first to the third embodiments in that a sliding guide plate 19 is fitted to the second wrist element 12. The surface of the sliding guide plate 19 has a sliding guide surface for the torch cable 3. A piercing guide 3g similar to the piercing guide 3c is also provided on the sliding guide plate 19. The torch cable 3 is guided through this piercing guide 3g. The sliding guide plate 19 is made of a flexible material to form a smooth surface on which the torch cable 3 can easily slide in contact. As shown in FIG. 6a and FIG. 6b, the sliding guide plate 19 can have a thickness gradually decreasing in a direction away from the welding torch 2. Alternatively, the sliding guide plate 19 can have a constant thickness, and the front end is a free end. Based on the provision of the sliding guide plate 19, the torch cable 3 can be securely prevented from coming into contact with the front part of the forearm of the robot or from being entangled.

According to the present embodiment, while the tension generating mechanism (i.e., the tension generator 80, the wire 81, and the pulley 82) used in the first embodiment is not employed, this tension generating mechanism can be used in a similar manner to that in the first embodiment. To further simplify the structure, the sliding mechanism 6 can be omitted, and the intermediate guiding section 3f can be directly provided on the supporting base 5 or the forearm base 10.

FIG. 6a and FIG. 6b are front views of a schematic configuration of the arc-welding robot system according to modifications of the fourth embodiment. The configuration shown in FIG. 6a is explained first. The sliding mechanism is omitted, and the intermediate guiding section 3f is directly provided on the forearm base 10. A piercing guide 3g" that is provided on the intermediate guiding section 3f has a larger external diameter than that of the torch cable 3. The torch cable 3 is guided to be able to freely reciprocally move in a direction approximately parallel with the longitudinal direction of the torch cable. As shown in FIG. 6a, a similar piercing guide 3g' is provided at a suitable position on the forearm using a guide support or the like, thereby supporting the torch cable 3. The piercing guide 3g is also provided on the sliding guide plate 19, thereby supporting the torch cable 3. Based on these piercing guides, even when the wrist axis of the robot operates, the torch cable can always keep a stable posture along the forearm. According to the present modification, while the tension generating mechanism used in the first embodiment is not employed, this tension generating mechanism can be used in a similar manner to that in the first embodiment.

The configuration shown in FIG. 6b is explained next. In FIG. 6b, the piercing guide 3g' and the guide support shown in FIG. 6a are deleted. In FIG. 6b, the piercing guide 3g' at the center is deleted. When the position of the free end of the sliding guide plate 19 is extended to the longitudinal direction of the forearm, the position of the piercing guide 3g can be also set closer to the position of the piercing guide 3g". With this arrangement, even when the wrist axis of the robot operates, the torch cable can always keep a stable posture along the forearm in a similar manner to that explained with reference to FIG. 6a. Further, when the piercing guide 3g" is fixed to the forearm via bearings or the like so as to be rotatable around the axis perpendicular to the longitudinal direction of the torch cable, a bending or a twisting of the torch cable can be relaxed.

According to the above embodiments and modifications, the wire feeder 4 is not mounted on the forearm, unlike the related art. Therefore, the device on the forearm 10 can be simplified. As a result, generation of a large interference area behind and above the robot can be avoided. When the wrist axis of the robot operates, the intermediate fitting section or the intermediate guiding section that limits the moving of the torch cable can stabilize the posture of the torch cable 3 without using a special device that pulls the torch cable toward a direction opposite to the working tool (i.e., the welding torch 2). Accordingly, an excessive tension or an excessive loosening of the torch cable 3 can be avoided. Even when the wrist of the robot operates, a change in the curvature of the torch cable 3 can be minimized, thereby stabilizing the posture of the torch cable. As a result, unstable feeding of the welding wire using the torch cable 3 can be avoided, and the welding quality is improved.

Figure 7A:
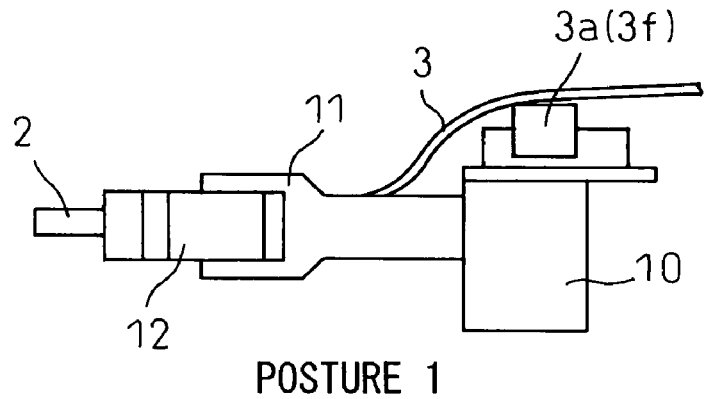
FIG. 7a is a front view of a schematic configuration of the arc-welding robot system showing the posture of the torch cable when a first wrist element moves in posture 1.
Figure 7B:
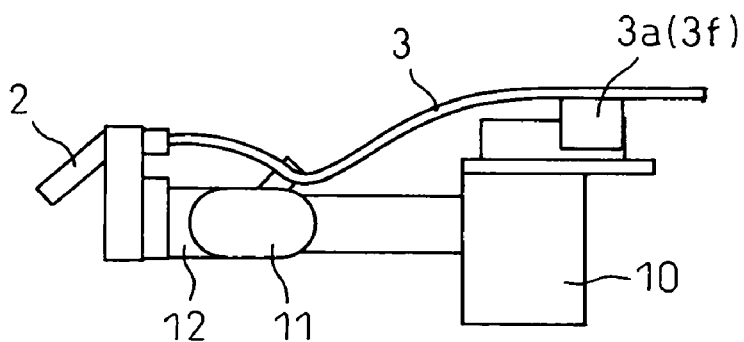
FIG. 7b is a front view of a schematic configuration of the arc-welding robot system showing the posture of the torch cable when the first wrist element moves in posture 2.
Figure 7C:
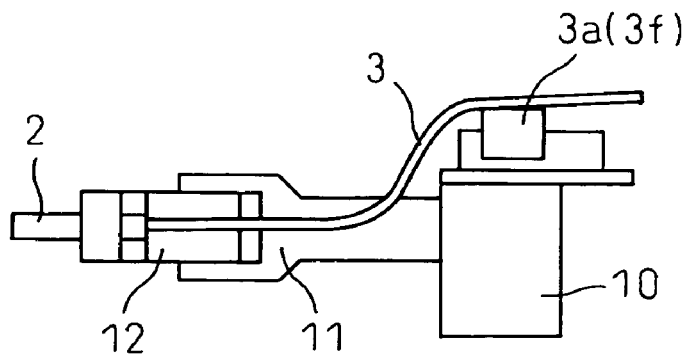
FIG. 7c is a front view of a schematic configuration of the arc-welding robot system showing the posture of the torch cable when the first wrist element moves in posture 3.

When the first wrist element operates in a first posture to a third posture as shown in FIG. 7a to FIG. 7c, the torch cable 3 is wound around the forearm. While the slider of the linear guide at the back of the forearm moves to the working tool side, the intermediate fitting section 3a (or the intermediate guiding section 3f) guides the torch cable and stabilizes the posture of the torch cable 3. In other words, a part of the torch cable 3 positioned between the intermediate fitting section 3a (or the intermediate guiding section 3f) and the wire feeder 4 moves to the working tool side by the length necessary for the torch cable 3 to be wound around the forearm. However, the torch cable 3 on the upper arm can maintain a stable posture.

The torch cable 3 is also guided by the sliding guide plate 19 shown in FIG. 6a and FIG. 6b, so that the torch cable 3 is maintained in a stable posture in a manner similar to the above.

Figure 8A:
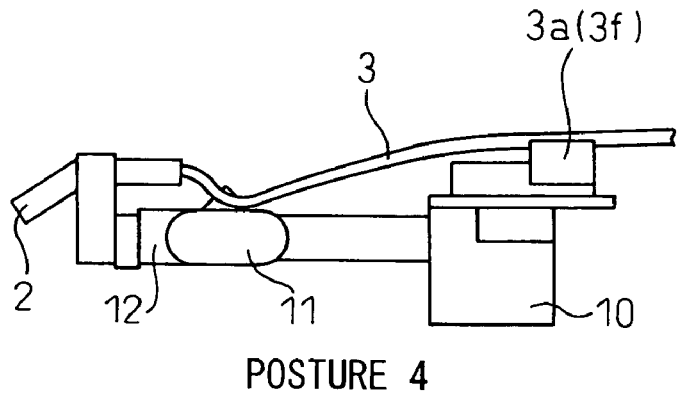
FIG. 8a is a front view of a schematic configuration of the arc-welding robot system showing the posture of the torch cable when a second wrist element moves in posture 4.
Figure 8B:
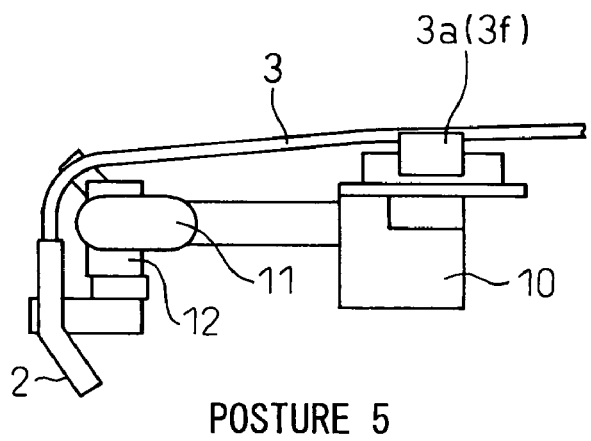
FIG. 8b is a front view of a schematic configuration of the arc-welding robot system showing the posture of the torch cable when the second wrist element moves in posture 5.
Figure 8C:
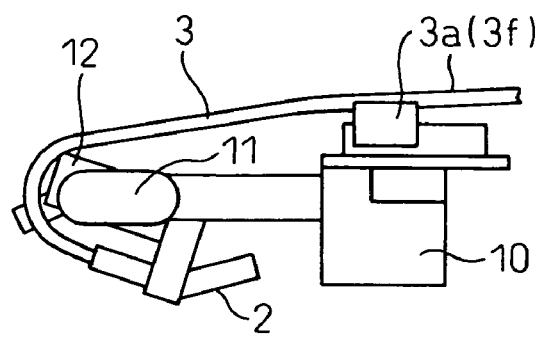
FIG. 8c is a front view of a schematic configuration of the arc-welding robot system showing the posture of the torch cable when the second wrist element moves in posture 6.

When the second wrist element operates in a fourth posture to a sixth posture as shown in FIG. 8a to FIG. 8c, the fitting position of the torch cable 3 at the working tool side changes due to the moving of the second wrist element. Therefore, the slider of the linear guide moves to the welding torch 2 side. However, because the guiding member 3h at the front end of the wrist (3g in FIG. 5) and the intermediate fitting section 3a (or the intermediate guiding section 3f) guide the torch cable 3, the posture of the torch cable 3 can be stabilized. In other words, a part of the torch cable between the intermediate fitting section 3a (or the intermediate guiding section 3f) and the wire feeder 4 moves to the welding torch 2 side by the length necessary for the fixed end (for example, the conduit fixed end) at the welding torch 2 side to move. However, the torch cable 3 around the upper arm can always maintain a stable posture.

In place of the guiding member 3h, the sliding guide plate 19 shown in FIG. 6a and FIG. 6b can also guide the torch cable 3, thereby stably maintaining the posture of the torch cable 3.

Although the invention has been shown and described with exemplary embodiments thereof, it should be understood, by those skilled in the art, that the foregoing and various other changes, omissions and additions may be made therein and thereto without departing from the spirit and the scope of the invention.

What is claimed is:

1. A torch cable disposition structure for an arc-welding robot, comprising:
   a forearm base;
   a forearm including a first wrist element;
   a second wrist element; and
   a welding torch, wherein
   the first wrist element is rotatably provided around a first axis line along a longitudinal direction of the forearm, on the front end of the forearm base,
   the second wrist element is rotatably provided around a second axis line that crosses the first axis line approximately perpendicularly, on the first wrist element,
   the welding torch is rotatably provided around a third axis line that is approximately perpendicular to the second axis line and is away from the first axis line with a predetermined distance, on the second wrist element,
   a welding wire is supplied to the welding torch using a torch cable,
   the torch cable is disposed from a wire feeder provided at a position other than the forearm, toward the welding torch via an intermediate fitting section provided on the forearm base, and
   an intermediate part of the torch cable is fitted to the intermediate fitting section via a sliding mechanism reciprocally movable along a direction approximately parallel with the first axis line;
   wherein a flexible guide plate is fitted to the second wrist element, a piercing guide member through which the torch cable is guided, is provided on an end of the flexible guide plate.

2. The torch cable disposition structure for an arc-welding robot according to claim 1, further comprising a unit that applies force to pull a slider of the sliding mechanism to a direction parallel with the first axis line and opposite to the welding torch.

3. The torch cable disposition structure for an arc-welding robot according to claim 1, wherein the wire feeder is disposed on a mounting table of a stand arranged at the outside of the arc-welding robot.

4. The torch cable disposition structure for an arc-welding robot according to claim 1, wherein the torch cable is suspended by a spring dropped from a ceiling.

5. The torch cable disposition structure for an arc-welding robot according to claim 1, wherein the flexible guide plate has a thickness gradually decreasing in a direction away from the welding torch.

6. The torch cable disposition structure for an arc-welding robot according to claim 1, wherein the torch cable includes a welding wire liner passed though an assist gas tube, and a multicore cable containing plural conductors;
   the welding wire liner and the multicore cable are contained in a tube;
   the welding wire liner and the assist gas tube are disposed to pass through substantially an axis core of the tube; and the multicore cable is disposed to pass through a position deviated a certain distance from the axis core of the tube.

7. A torch cable disposition structure for an arc-welding robot, comprising:
   a forearm base;
   a forearm including a first wrist element;
   a second wrist element; and
   a welding torch, wherein
   the first wrist element is rotatably provided around a first axis line along a longitudinal direction of the forearm, on the front end of the forearm base,
   the second wrist element is rotatably provided around a second axis line that crosses the first axis line approximately perpendicularly, on the first wrist element,
   the welding torch is provided rotatably around a third axis line that is approximately perpendicular to the second axis line and is away from the first axis line with a predetermined distance, on the second wrist element,
   a welding wire is supplied to the welding torch using a torch cable,
   the torch cable is disposed from a wire feeder provided at a position other than the forearm, toward the welding torch via an intermediate guiding section provided on the forearm base,
   and a guiding member, that guides an intermediate part of the torch cable in a reciprocally movable state along a longitudinal direction of the torch cable, is provided in the intermediate guiding section;

wherein a flexible guide plate is fitted to the second wrist element, a piercing guide member through which the torch cable is guided, is provided on an end of an flexible guide plate.

8. The torch cable disposition structure for an arc-welding robot according to claim 7, further comprising a unit that applies force to pull the guiding member to a direction parallel with the longitudinal direction of the torch cable and opposite to the welding torch.

9. The torch cable disposition structure for an arc-welding robot according to claim 7, wherein the wire feeder is disposed on a mounting table of a stand arranged at the outside of the arc-welding robot.

10. The torch cable disposition structure for an arc-welding robot according to claim 7, wherein the torch cable is suspended by a spring dropped from a ceiling.

11. The torch cable disposition structure for an arc-welding robot according to claim 7, wherein the flexible guide plate has a thickness gradually decreasing in a direction away from the welding torch.

12. The torch cable disposition structure for an arc-welding robot according to claim 7, wherein the torch cable includes a welding wire liner passed though an assist gas tube, and a multicore cable containing plural conductors;
the welding wire liner and the multicore cable are contained in a tube;
the welding wire liner and the assist gas tube are disposed to pass through substantially an axis core of the tube; and the multicore cable is disposed to pass through a position deviated a certain distance from the axis core of the tube.

* * * * *